(12) United States Patent
Kalajan et al.

(10) Patent No.: US 12,200,037 B2
(45) Date of Patent: Jan. 14, 2025

(54) COMPUTER-IMPLEMENTED SYSTEM AND METHOD FOR UPLOADING MEDIA TO AN INSPECTION RECORD VIA HYBRID TELEPHONY AND WORLD WIDE WEB PROTOCOLS

(71) Applicant: VuSpex Inc., Watsonville, CA (US)

(72) Inventors: Kevin Kalajan, Arroyo Grande, CA (US); Todd Wahoske, Nevada City, CA (US)

(73) Assignee: VuSpex Inc., Watsonville, CA (US)

( * ) Notice: Subject to any disclaimer, the term of this patent is extended or adjusted under 35 U.S.C. 154(b) by 105 days.

(21) Appl. No.: 18/205,306

(22) Filed: Jun. 2, 2023

(65) Prior Publication Data

US 2023/0308499 A1 Sep. 28, 2023

Related U.S. Application Data

(63) Continuation-in-part of application No. 17/587,596, filed on Jan. 28, 2022, now Pat. No. 11,963,072.

(51) Int. Cl.
*H04L 65/75* (2022.01)
*H04L 65/1083* (2022.01)

(52) U.S. Cl.
CPC ........ *H04L 65/762* (2022.05); *H04L 65/1083* (2013.01)

(58) Field of Classification Search
CPC .......................... H04L 65/762; H04L 65/1083
See application file for complete search history.

(56) References Cited

U.S. PATENT DOCUMENTS

| 7,639,943 | B1 | 12/2009 | Kalajan | |
|---|---|---|---|---|
| 8,385,950 | B1 | 2/2013 | Wagner | |
| 8,418,231 | B2 | 4/2013 | Denny | |
| 8,665,337 | B2 | 3/2014 | Mikawa | |
| 8,818,018 | B2 * | 8/2014 | Simske | ................. G06T 1/0028 |
| | | | | 382/100 |
| 10,402,064 | B1 * | 9/2019 | Al-Sallami | ........... G06F 40/186 |
| 10,796,374 | B1 | 10/2020 | Cuttell | |
| 11,163,941 | B1 | 11/2021 | Majid | |
| 11,190,679 | B2 | 11/2021 | Ebsen | |
| 11,228,551 | B1 | 1/2022 | Baron | |
| 11,641,513 | B2 * | 5/2023 | Maniglia | ............. H04L 43/0876 |
| | | | | 709/206 |

(Continued)

*Primary Examiner* — Adam D Houston
(74) *Attorney, Agent, or Firm* — Inventive Law Inc.; Jim H. Salter (57) ABSTRACT

A computer-implemented system and method for uploading media to an inspection record via a hybrid cell telephony connection and WWW protocol connection are disclosed. Example embodiments include: initiating a telephony call by an authority representative (Auth) having an inspector record for which remote capturing or viewing of media by a Field Agent (FA) is needed for an inspection at a site; sending a notification to a device of the FA (FA device), the notification including a link to establish a data connection between the FA device and a public-facing web server/service (PFWS); establishing a connection with the PFWS and prompting the FA by use of the telephony call to capture one or more snapshots or videos (media) at the site using a camera of the FA device; and uploading the media to the PFWS for storage.

20 Claims, 8 Drawing Sheets

(56) References Cited

U.S. PATENT DOCUMENTS

| | | | |
|---|---|---|---|
| 2014/0270141 A1* | 9/2014 | Filonov | H04L 9/0819 |
| | | | 379/265.07 |
| 2016/0267270 A1* | 9/2016 | Lee | G06F 21/564 |
| 2017/0026711 A1* | 1/2017 | Qiu | H04N 21/4425 |
| 2017/0332421 A1* | 11/2017 | Sternberg | H04L 12/4641 |
| 2022/0197620 A1* | 6/2022 | Vihar | G06F 8/65 |
| 2022/0256037 A1* | 8/2022 | Naidu | H04L 65/65 |
| 2023/0247393 A1* | 8/2023 | Kalajan | H04W 8/26 |
| | | | 455/466 |
| 2023/0308499 A1* | 9/2023 | Kalajan | H04L 65/1083 |

* cited by examiner

```
Processing Logic for Uploading Media to an Inspection Record
via a Hybrid Cell Telephony Connection and WWW Protocol Connection
-1000-
```

```
Initiate a telephony call by an authority representative (Auth) having an
inspector record for which remote capturing or viewing of media by a
Field Agent (FA) is needed for an inspection at a site.
-1010-
```

```
Upon connection of the telephony call, send a notification to a device of
the FA (FA device), the notification including a link to establish a data
connection between the FA device and a public-facing web server/service
(PFWS).
-1020-
```

```
Upon activation of the link on the FA device, establish a connection with
the PFWS and prompt the FA by use of the telephony call to capture one
or more snapshots or videos (media) at the site using a camera of the FA
device.
-1030-
```

```
Upon capture of the media by the FA device, upload the media to the
PFWS for storage, the PFWS associating a unique identifier with the
uploaded media, the unique identifier being associated with the inspector
record for the inspection at the site.
-1040-
```

```
Enable the Auth to access and view the stored media associated with the
inspector record for the inspection at the site.
-1050-
```

End

Fig. 8

COMPUTER-IMPLEMENTED SYSTEM AND METHOD FOR UPLOADING MEDIA TO AN INSPECTION RECORD VIA HYBRID TELEPHONY AND WORLD WIDE WEB PROTOCOLS

PRIORITY PATENT APPLICATION

This patent application claims the benefit of U.S. patent application Ser. No. 17/587,596, filed on Jan. 28, 2022, the disclosure of which is incorporated herein by reference in its entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and disclosure as described below and to the drawings that form a part of this document: Copyright 2022-2023, Kevin Kalajan, Todd Wahoske, and VuSpex, Inc., All Rights Reserved.

TECHNICAL FIELD

This patent application relates to the field of telephony and web WORLD WIDE WEB (WWW) upload protocols, inspections (both virtual and traditional), network media and data communications, and mobile communications in the various example embodiments disclosed herein.

BACKGROUND

Over the past ten years, the Internet (public networking) has been used to upload multimedia content from a mobile device to various web services. For example, an insurance company may allow an insured to upload photos or other content related to damage to their vehicle as proof, instead of an adjuster personally visiting the vehicle. Furthermore, in the past 5 years, inspection departments from Community Development public agencies and private sector companies are increasingly allowing live virtual inspections vs. in-person inspections.

U.S. Pat. No. 10,796,374 references the use of aerial images to conduct a virtual inspection based on an inspection model within a time threshold.

However, U.S. Pat. No. 10,796,374 and other related conventional technologies do not provide a system or method for managing the upload of media via world wide web (WWW) protocols simultaneously with a cell phone voice call in a way that assigns the uploaded media to specific inspection records. Conventional technologies also do not address the reverse geocoding of content, watermarking of content, and handling multiple media types (e.g. photos and videos). Furthermore, conventional technologies do not allow an authority to direct a Field Agent during the real-time upload of media for an inspection. This capability would eliminate the problems associated with installing an "app" or having to navigate to a web portal with a phone browser, creating an account, and figuring out how to upload content from a phone. Finally, while streaming (e.g. WebRTC) connections are available for virtual inspections, these connections (WebRTC) will not work with degraded bandwidth. As such, conventional technologies fail to provide an ability for a pseudo-realtime virtual inspection when bandwidth is limited. Thus, a computer-implemented system and method for uploading media via a hybrid combination of a cell phone call with Hypertext Transfer Protocol (HTTP) web upload protocols is needed.

BRIEF DESCRIPTION OF THE DRAWINGS

Embodiments are illustrated by way of example and not limitation in the figures of the accompanying drawings, in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

In various example embodiments described herein, a computer-implemented system and method for uploading media to an inspection record via a hybrid cell telephony connection and WWW protocol connection are disclosed. In the disclosed example embodiments, a system and method manages the upload of media via hybrid cell phone connection and web protocols in a way that assigns the uploaded media to specific inspection records, and provides the ability to support images and video along with obtaining Global Positioning System (GPS) coordinates of said media and reverse geocoding to determine the street address or other type of location indicia of the media along with a watermark that shows the date and time when the media was taken along with the reverse geocoded street address or other type of location indicia. The disclosed example embodiments allow an authority to initiate the hybrid inspection of media for an inspection. This capability eliminates the problems associated with installing a software application or "app" on a computing device or having to navigate to a web portal with a phone browser, creating an account, and figuring out how to upload content from a phone. In various example embodiments, a computer-implemented system and method are disclosed for uploading and managing media via a hybrid cell phone connection and web (data) connection. Furthermore, in the case of a traditional virtual inspection where data network connectivity becomes reduced, this hybrid submission can be used to continue content submission for the purpose of the inspection.

Figure 1:
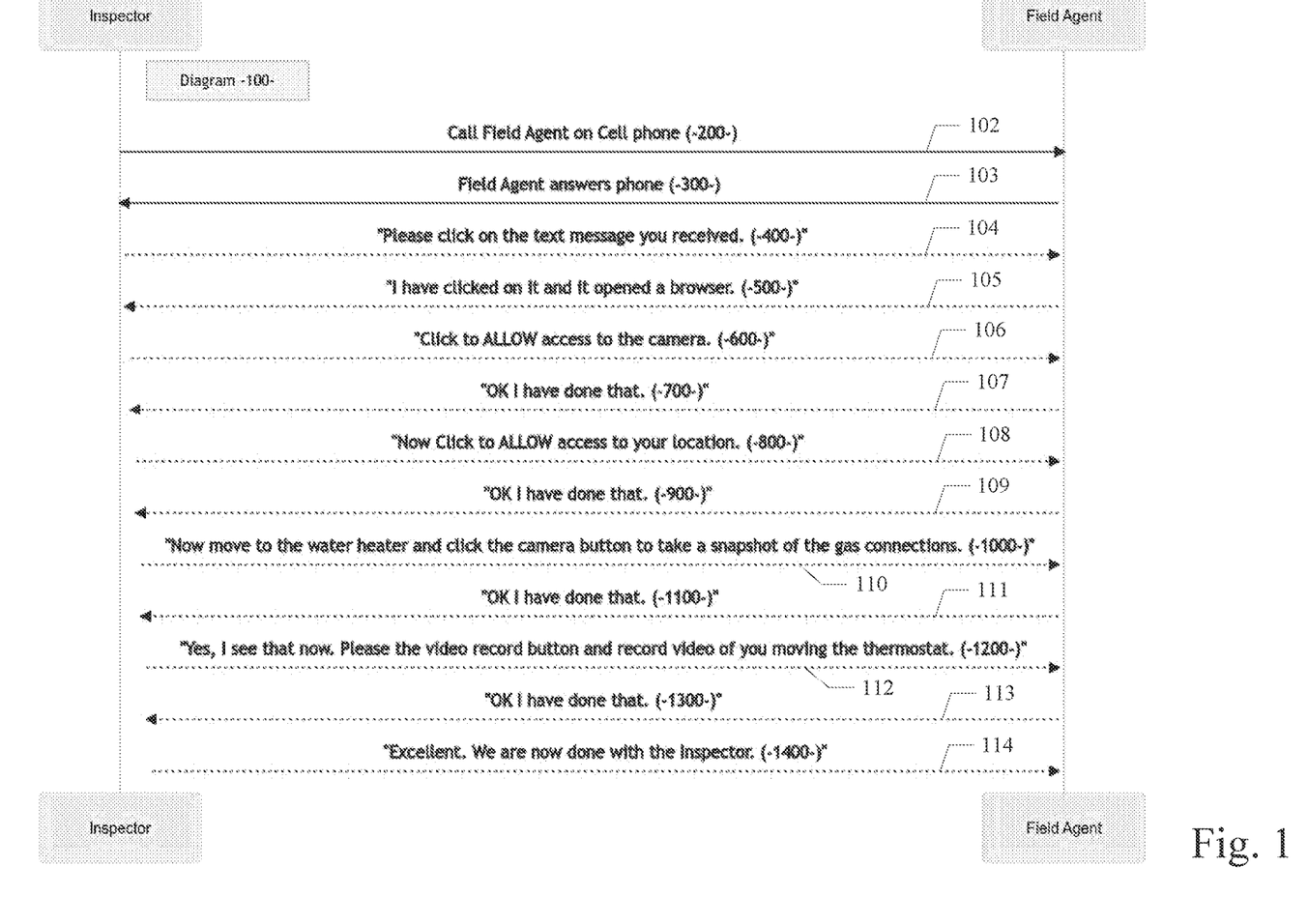
FIG. 1 (Diagram 100) illustrates a sample verbal flow between an Inspector ("AUTH") and a Field Agent ("FA") over an audio connection.

Referring to FIG. 1 (Diagram 100), the diagram illustrates an example embodiment showing the overall sequence of events between an Inspector ("AUTH") and a Field Agent ("FA"). In the example embodiment, the Inspector works from an Inspector Record for which they need to capture or view media from the FA to determine the result of an inspection. This is also depicted in Step 201 of FIG. 2 (Flowchart 100). At step 102 of FIG. 1 (Diagram 100), in one embodiment, the AUTH determines that the FA does not have sufficient bandwidth to conduct a traditional virtual inspection using streaming protocols such as WebRTC (other streaming protocols exist that are both standards or proprietary and other embodiments could use any streaming protocols such as RTSP or RTMP among others). In other embodiments, different criteria may exist for why the AUTH decides to initiate a call with the FA using the system described in the example embodiments disclosed herein (poor data connectivity being one, in this embodiment).

The AUTH performs a user action that initiates a notification, or SMS/text message (or email, direct message, etc. in other embodiments). In an example embodiment, the notification or SMS message is initiated programmatically from various "Cloud" based services such as Twilio™ that allow a software developer to use an Application Programming Interface (API) to request a text message be sent to a destination phone number via SMS. This is depicted in steps 305, 307, 308, and 309 in FIG. 3 (Diagram 200).

Figure 2:
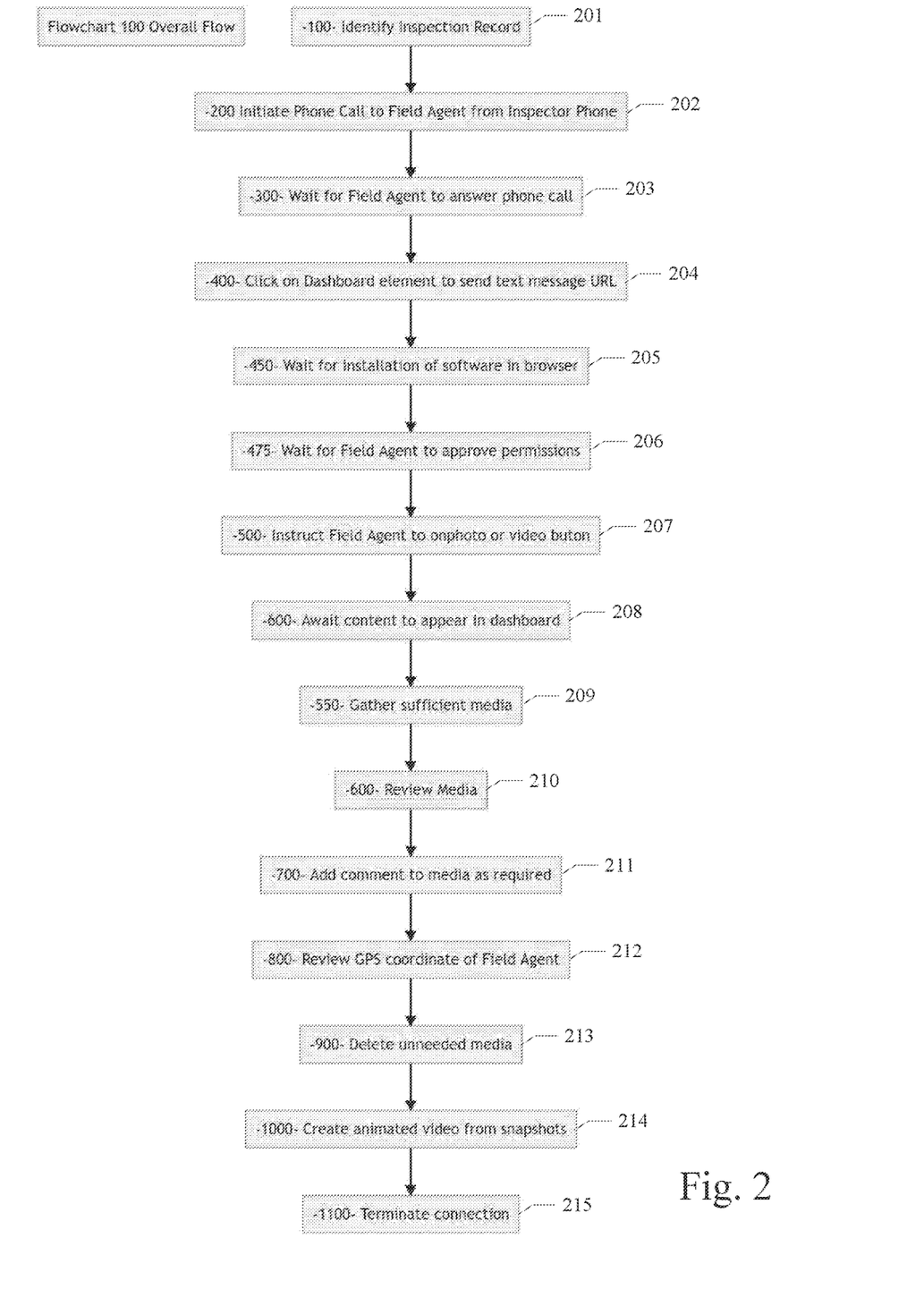
FIG. 2 (Flowchart 100) illustrates the logical flow between the AUTH and the FA.

As depicted in Step 102 in FIG. 1 (Diagram 100) and in Step 202 in FIG. 2 (Flowchart 100), the AUTH can call the FA on their device (e.g., the FA's cellphone). In another embodiment, the FA can have a tablet that has cell connection or WIFI-calling capability and can answer a phone. In other embodiments, the FA can be contacted on any device where an audio connection can be established, the FA has a camera built-in or attached over any network connection (e.g. HDMI, USB, Bluetooth™, etc.), and the FA's device has some form of direct or relayed or proxied Internet connection supporting WWW protocols.

The AUTH must wait for the FA to answer the call, as depicted in step 203 of FIG. 2 (Flowchart 100). In step 203, the FA answers the call (which in another embodiment could be over a Voice-over-IP call (VOIP) or analogous technologies) and begins speaking with the AUTH.

Figure 3:
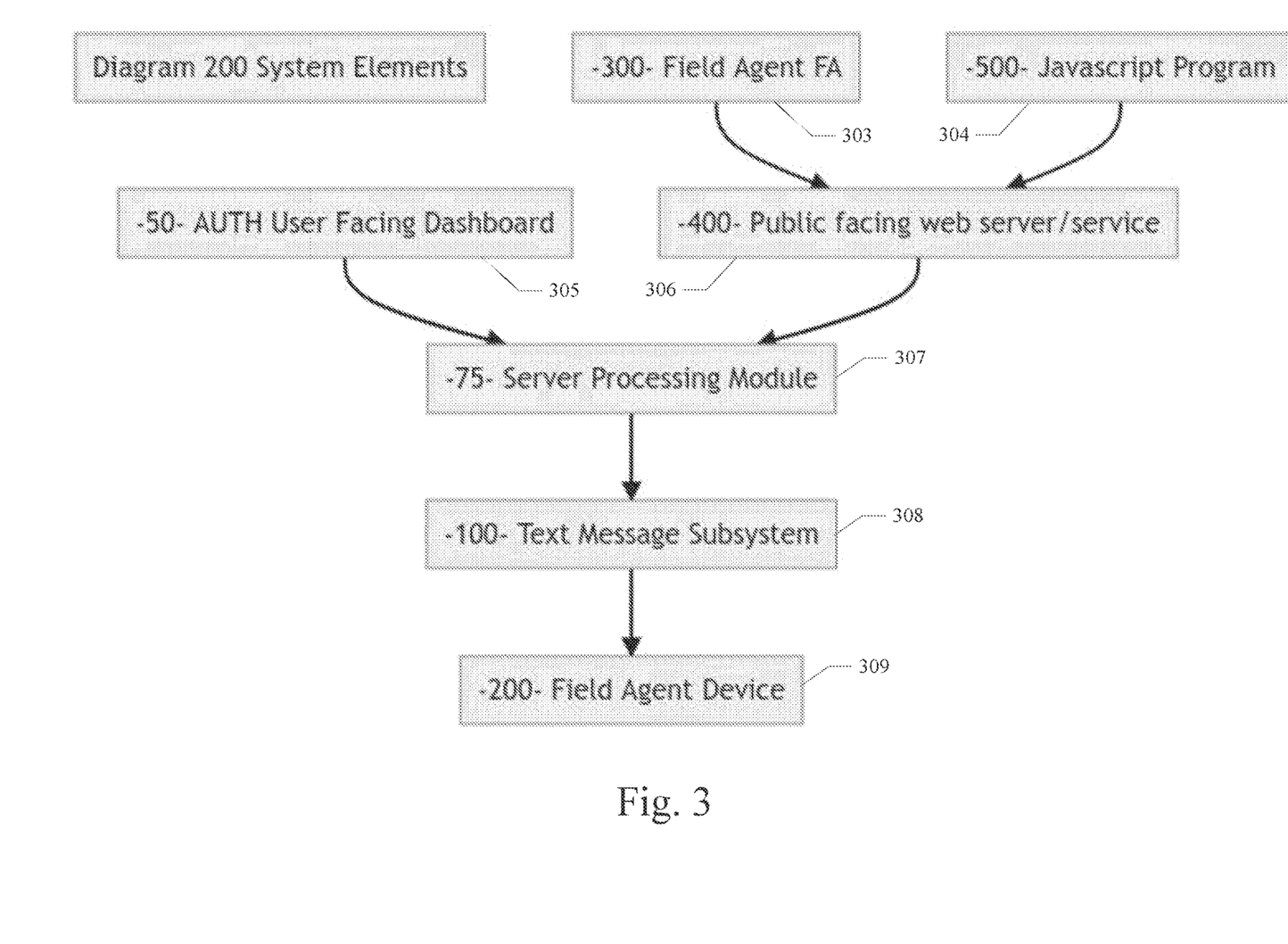
FIG. 3 (FIG. 3 (Diagram 200)) illustrates the system elements of an example embodiment.

The AUTH can click a button, link, or equivalent widget (or issued a voice command in another embodiment) that tells the Text Message Subsystem (TMS, See FIG. 3 (Diagram 200)) to send a text message to the FA's phone number. In another embodiment, this could be via email or a direct message chat system or similar social networking feature. See step 204 of FIG. 2 (Flowchart 100).

At this point in the process, the AUTH and FA are communicating in real-time over a voice connection. As described in step 104 in FIG. 1 (Diagram 100), the AUTH can now inform the FA to click on the notification message that was received. This message contains a link that when clicked, connects to the public-facing web server/service ("PFWS") as described in item 306 shown in FIG. 3 (Diagram 200).

The PFWS downloads a Javascript™ program (JP), in one embodiment, to run in the default browser (see step 205 in FIG. 2 (Flowchart 100)) on the device (see element 304 in FIG. 3 (Diagram 200)). In another embodiment, clicking on the text link can be configured to open a pre-installed app via an "association file" that is available with Android™ or iOS™ devices. In another embodiment, another script language or programming language is used other than Javascript™.

Figure 6:
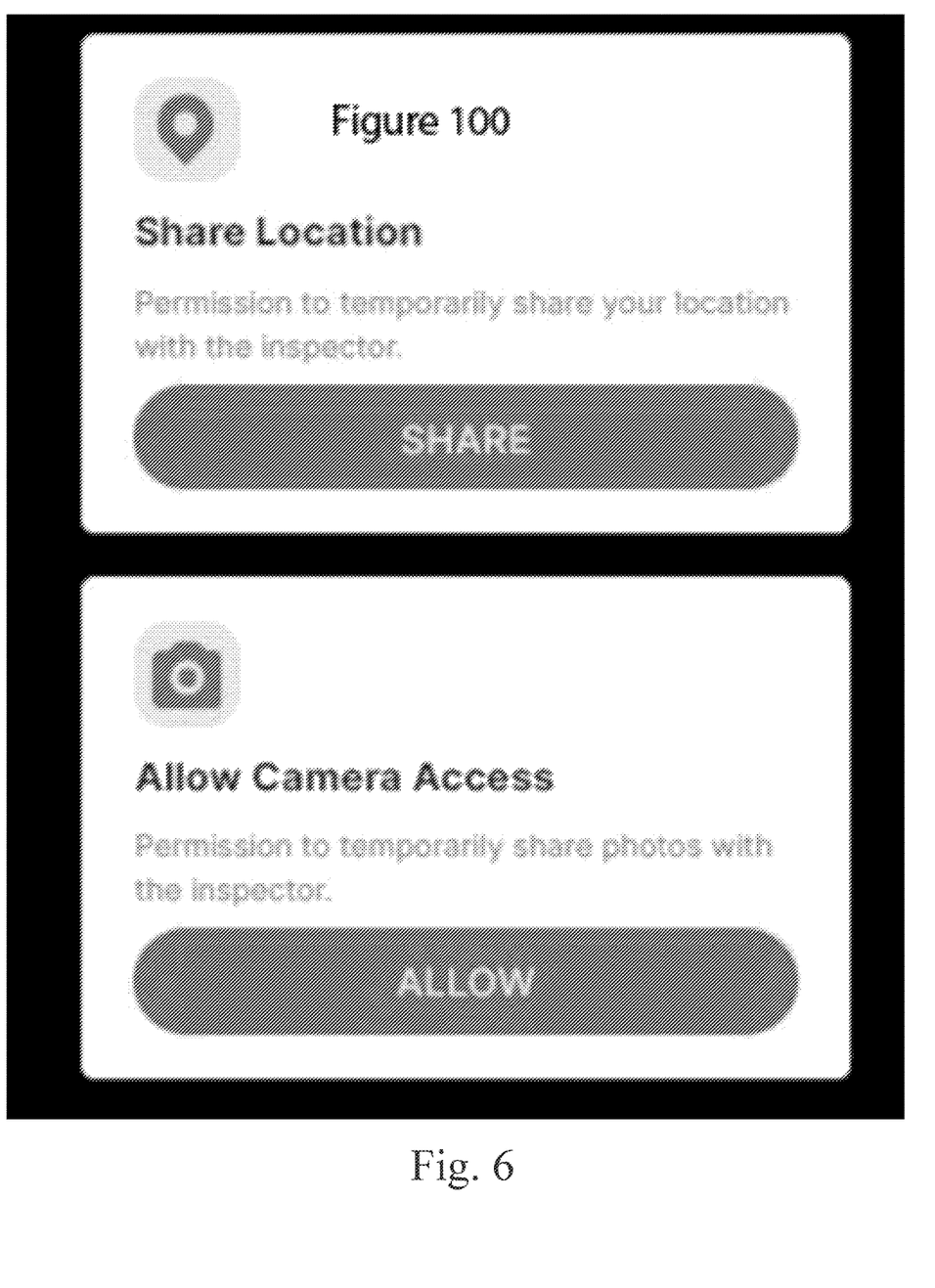
FIG. 6 illustrates a sample user interface for requesting access to the camera and location permissions on the FA device.

Whether an app or a Javascript is invoked, the app, or the browser (running Javascript) emits permission requests to the FA (see FIG. 6). The permission requests are normally generated by the browser when the Javascript program (in one embodiment) makes a request to obtain permits to access location services to the camera. These permission requests allow the app/browser to have access to the FA's camera and to obtain the FA's current GPS location (see step 205 in FIG. 2 (Flowchart 100) and steps 106 through 109 shown in FIG. 1 (Diagram 100)).

Figure 7:
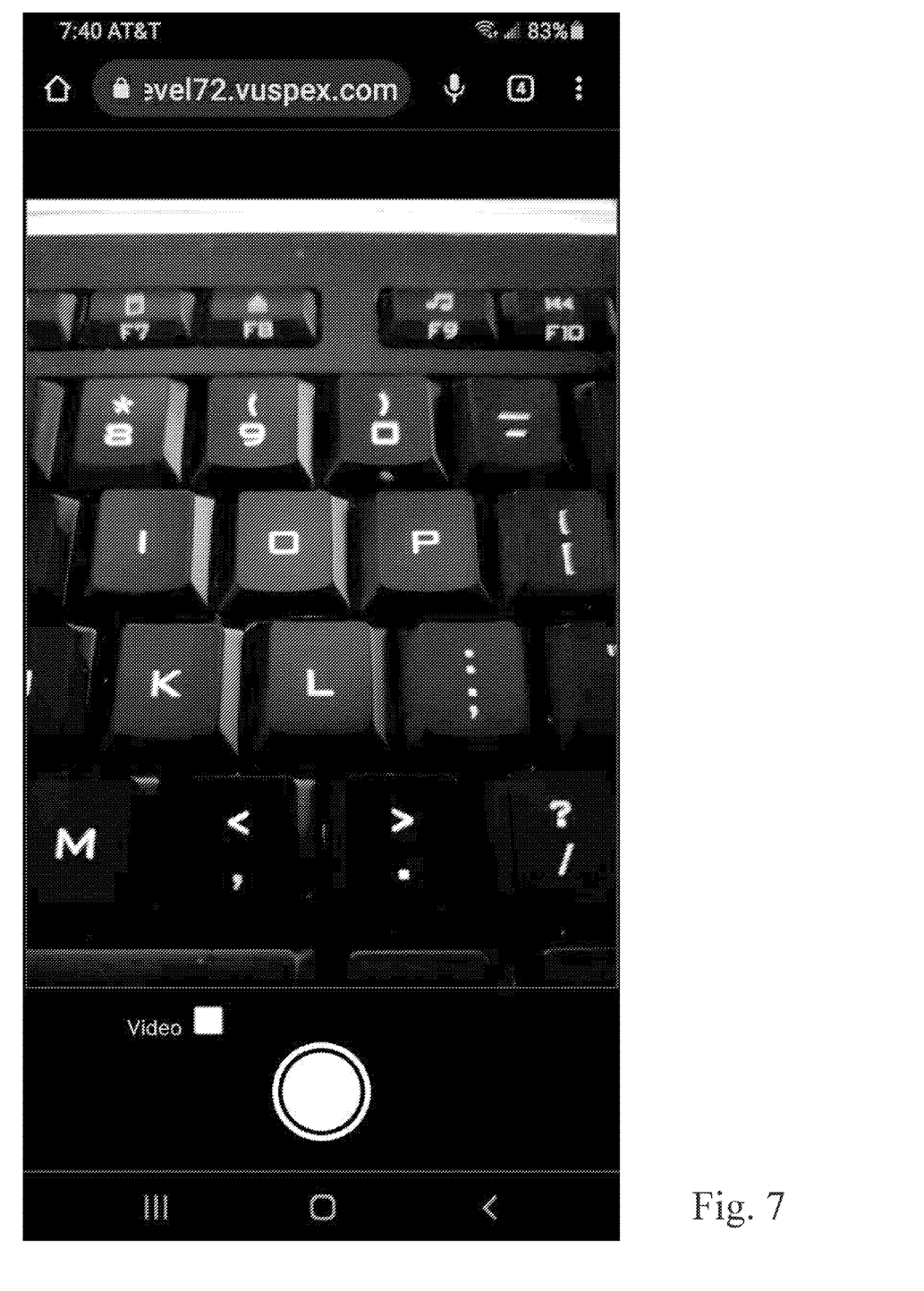
FIG. 7 illustrates a sample user interface for the FA to be able to capture snapshot images or video fragments.

Once the permissions are approved, the FA is presented with a user interface that has, in one embodiment, an option to click on a button or select a widget that will take a snapshot (see FIG. 7). In yet another embodiment, there is a way for the FA to select to record video for some duration. In one embodiment, the elapsed time or estimated file size recorded thus far is presented to the user.

For the next step, see Step 110 in FIG. 1 (Diagram 100). The AUTH communicates over the audio connection to direct the FA where the FA should capture the media content (either photo or video). The AUTH instructs the FA to click on the camera snapshot icon when a snapshot is required.

However, before the media can be taken, in one embodiment, the AUTH verifies the FA is in the correct location by verifying the FA's location on a map. This is accomplished by the Javascript program obtaining the current GPS coordinates from the underlying browser or operating system.

These coordinates are sent to the PFWS along with a HASH uniquely identifying the inspector for which this applies. In one embodiment, the Javascript program creates an "interval request" that repeats every N seconds that sends the GPS coordinates to the AUTH via the PFWS so that the AUTH can verify the FA has not left the required region.

Element 305 in FIG. 3 (Diagram 200) depicts the dashboard used by the AUTH. The AUTH User facing dashboard (AUFD) receives period requests from the Javascript program with the HASH identifying the inspection and the GPS coordinates of the FA. If reverse geolocation conversion to a street address is performed by the Javascript program, the street address could be provided by the Javascript program instead of the GPS coordinates.

Any time the AUFD receives a GPS or location update from the Javascript program, it updates, in one embodiment, two markers on a map: the location of the FA and the inspection address. This can be done by using Google™ Maps, ESRI, Apple™ Maps, and/or any other off-the-shelf or custom software that allows taking a street address or GPS coordinates and generating a map with a relevant marker in the correct location.

When the FA clicks on the snapshot icon, the Javascript program downloaded (in one embodiment) requests the contents (in pixels) of the current camera view using existing technology available within the phone operating system via the browser's Javascript implementation. The Javascript run time engine returns the base64-encoded (in one embodiment) data to the Javascript program at which point the program must send the data back to PFWS (element 306 in FIG. 3 (Diagram 200)).

However, the Javascript program must indicate for what inspection this content is relevant. This is done by connecting the Uniform Resource Locator (URL) that launched the Javascript program to a unique identifier that the PFWS can use to know where the incoming media content should be associated.

Figure 4:
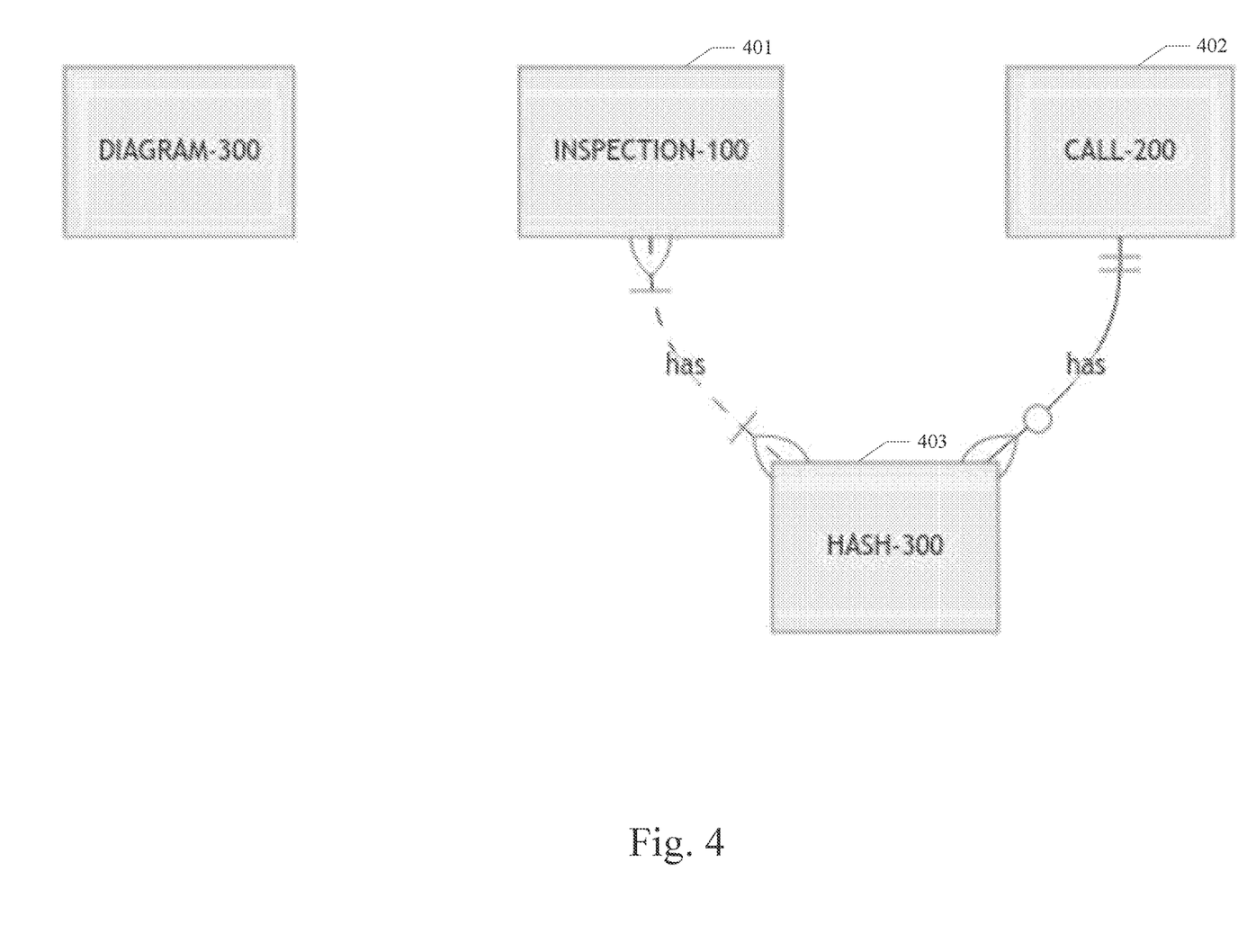
FIG. 4 (Diagram 300) illustrates the relationship between the INSPECTION schema and CALL schema related by the HASH unique ID.

In one embodiment, the initial URL sent via text message/SMS contains a unique identifier ("HASH"). In one embodiment, this HASH is stored in a database table on the PFWS and associated with the HASH with the relevant inspection schema in which the inspection is occurring. This is so that the HASH that is sent in the SMS URL can be retrieved by the Javascript program (JP) and used in requests to the PFWS to inform the PFWS to what inspection the media corresponds. See the elements 401 through 403 shown in FIG. 4 (Diagram 300).

The next step is for the JP to send the base64-encoded contents (in one embodiment) to the PFWS so that the media can be associated with the relevant inspection. First, the JP must obtain the URL of the current page from where it was loaded. In one embodiment this is done with a reference to "document.location.href" that contains the current page URL. Then, this value is parsed using string match or regex (in one embodiment) to extract the HASH value. Then a request is made via AJAX™ (in one embodiment) or analogous network communications service to send the binary contents to the PFWS. The User is informed with a spinner (in one embodiment) to show that the data is uploading. If the request times out given a maximum allowed time or a network error is received because of poor connectivity, the user is informed of a network error and has the option to retry the submission of the image.

Figure 5:
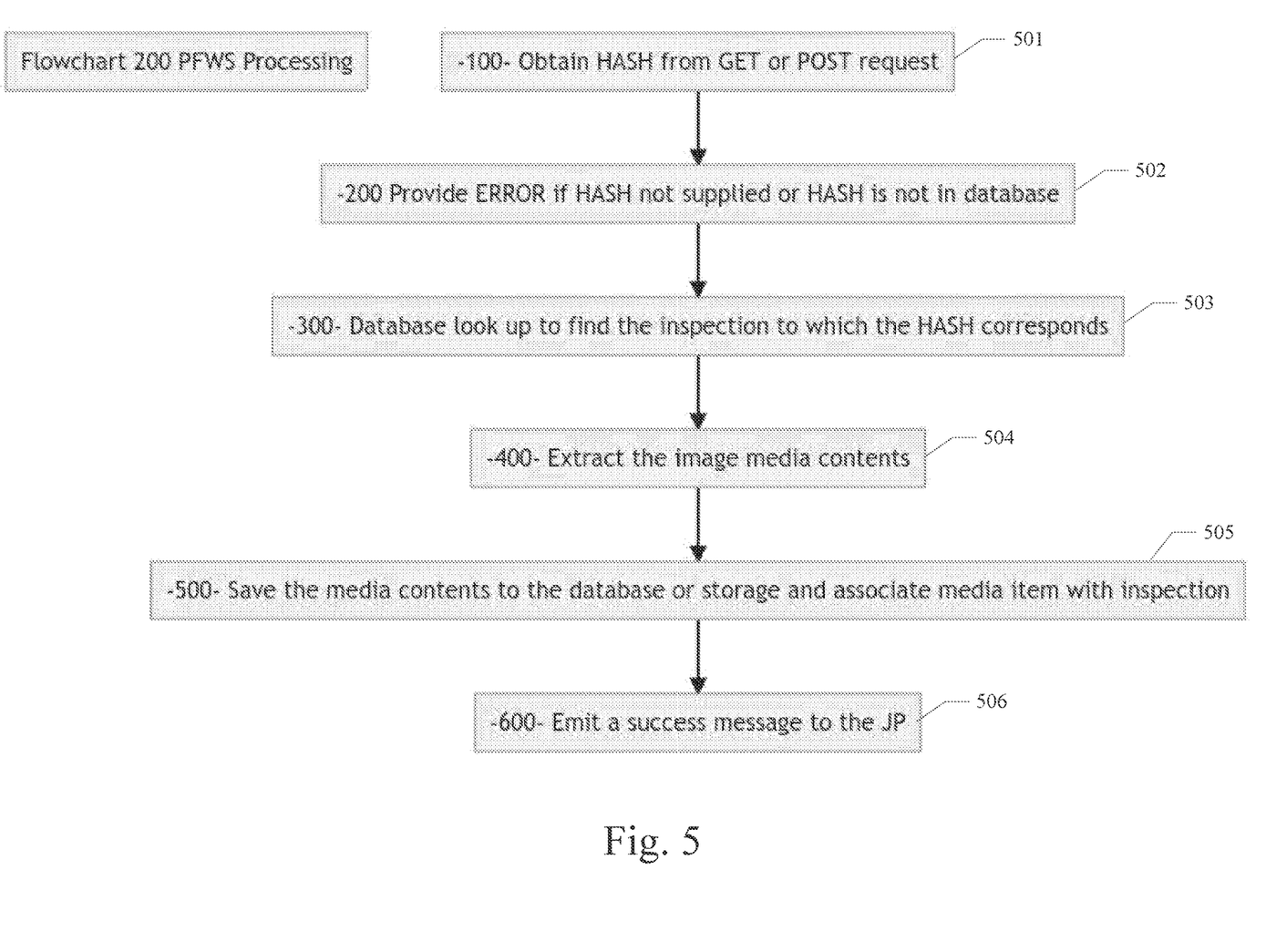
FIG. 5 (Flowchart 200) depicts a flowchart of how to process a media upload request with a HASH.

The PFWS must now store the media. Refer to FIG. 5 (Flowchart 200) for additional details. FIG. 5 (Flowchart 200) depicts a flowchart showing how to process a media upload request with a HASH. First, the software running on the PFWS checks for a HASH property in the HTTP GET or POST data (step 501 in an example embodiment). If there is no HASH, an error is emitted in response (step 502 in an example embodiment). If the HASH exists, it is looked up in the database table that associates a HASH with an inspection (step 503 in an example embodiment). If no such entry exists, the HASH is invalid and an error is emitted in response. If the HASH exists, the incoming image data is retrieved from the HTTP request (POST, PUT, websocket, etc.) and decoded into the desired or native image format (step 504 in an example embodiment). The data is stored in a persistent data storage facility and associated with an ID that is saved in a database table that associates the unique ID of the media item with the inspection associated with the HASH (step 505 in an example embodiment). The data can be stored in Azure™ Blob Storage, Amazon™ S3, a relational database, a NoSQL database, a file system, etc. Once the save is complete, a success message is sent back to the JP and the user can be informed the upload completed and the spinner disabled (step 506 in an example embodiment).

In another embodiment, the PFWS retrieves the most recent GPS coordinate (or street address) sent by the JP. When the image data arrives, the PFWS uses image manipulation programs such as the GD library for PHP to create a watermark on the incoming image that contains the date and time stamp (after adjusting for the timezone of the AUTH), the address or reverse geocoded street address which is accomplished by sending GPS coordinates to one of many reverse geocoding services such as the Google Maps API and then creating a text string that is rendered into a PNG or other transparent format to overlaid on top of the incoming image in a given location (e.g. top or bottom of the incoming image). This watermark thereby preserves the metadata of the image so when the image is distributed, the metadata remains intact and attached to the content.

Referring to step 112 in FIG. 1 (Diagram 100), the AUTH may now request a video fragment be recorded instead of an image. In this case, the FA must indicate to the JP that they want to record a video fragment instead of an image snapshot. This can be done with any number of user interface elements. In one embodiment, a user clicks a radio box to toggle recording video or snapshots being taken.

When the user clicks the JP user interface option to begin recording, the underlying JP informs the browser or operating system to begin recording video. Typically this request entails creating an object with an "end" or "stop" handler such that when the recording stops the "stop" handler in the JP receives a notification and the data that was recorded. In one embodiment, the JP can display the length or size of the video recorded thus far. Length can always be displayed by calculating the elapsed time from when recording started to the current time. Length may or may not be available from the browser or operating system.

When the FA terminates the recording the data is presented to the JP as described above. At this point, in one embodiment, the JP receives the binary data and either sends it as-is or converts it to a base64-encoded format (or any other format appropriate for the ease of sending to the PFWS). Typically, the JP would send the video to the PFWS in the same way the JP sent the snapshot image, including the HASH identifier (in one embodiment) and the underlying video contents. The PFWS processes and stores the video in the same way as it did the image, but in this case, stores a video in one of many possible formats (e.g. webm, ogg/vorbis, mp4, etc.). Upon success the PFWS returns a successful status response to the request by the JP. The AUTH continues directing the FA over the audio connection to take as many snapshots and videos as required.

In one embodiment, the AUTH can terminate the connection and inspection session by clicking a link or button provided by the AUFD. This causes a state change in a database table that maintains a connection state to the FA. The JP on the FA's devices polls the value of this state indicator via AJAX (in one embodiment) requests to the PFWS. The PFWS responds with a status, which, in one embodiment can be "Not yet started", "active", or "terminated." Once the JP receives a response of "terminated", the JP informs the user the inspection has completed and the JP terminates.

Capabilities of the AUTH with the AUFD

The AUFD provides many useful features for the AUTH. First, as the snapshots and videos arrive, they are displayed in a gallery. This is accomplished by either polling a database table of media that has been uploaded by the FA/JP or by an event driven architecture where the AUFD receives an asynchronous event indicating a new media item has been added along with the URL to fetch the media. Either through polling (in one embodiment) or event driven notification (in another embodiment), the AUFD can keep a list of media uploaded during the inspection session and provide a user interface to view and manipulate various components.

In another embodiment, each time a piece of media is uploaded by the FA, a "webhook" is called so that an interested party (such as a Land Management System (e.g. Accela™ Computronix™, CentralSquare™, or the like)) can be notified of an event along with the media content so that third parties can process and manage the media in real time as well.

In another embodiment, the AUTH can "invite" another individual or group via email address(es) or phone number(s) such that they can participate in the inspection. By clicking a link similar to what was sent to the FA, interested parties can view the incoming media in the same way the AUTH does using the same underlying technology.

This is a derivative use-case and does not require any additional capabilities other than what has been described other than the AUFD giving a button or link (or other UX element) to the AUTH to indicate the list of email addresses or phone number of who should be sent a link to join the session.

In one embodiment, when an invited user joins the session, a visual indicator can be provided to the AUTH (and other viewers) showing that a new viewer has joined along with their identifying information (email or phone invitation). This is done by the PFWS being the target of the link that the additional viewer clicks on and by using the HASH that is provided in the link (along with an identifier in the link that the user is a viewer and contains their phone number or email to indicate which user it is) the PFWS can inform the AUFD either via the AUFD polling or an event driven architecture that a new user has joined the inspection session.

Note, if the additional viewers are to hear the audio, then a VOIP or web-based telephony system must be used to initiate the call to the FA and to the additional viewers so that a multi-party conference line can be created so all participants can hear each other.

In this case, in one embodiment, services such as Twilio™, (web-based telephony) are used to initiate an outgoing call to the FA and subsequent additional viewers. The API provided by Twilio allows for a straightforward way to initiate a call to the FA and then have the AUTH join. Then, as additional viewers join, they can be outbound dialed by Twilio (or equivalent web telephony service) and join the audio conference.

The media, in one embodiment, has both a thumbnail and a full size image associated with it. A video has a thumbnail as well as the full video associated with it. The AUFD can differentiate to the AUTH whether the media item in the gallery is either a video or a static image (or some other media type). In one embodiment, a video has a dashed border around the thumbnail and a static image does not. In another embodiment, there is text labeling the media item as "Video." The AUFD provides a capability for the AUTH to adjust meta information for the media and to delete unneeded media (e.g. in the case a media snapshot is blurry or not relevant).

The AUTH may click on a user interface element to add a comment or change an existing comment. When the AUTH clicks on the element, a prompt is provided for the AUTH to provide a comment. When the comment is entered, the AUFD makes an AJAX request (in one embodiment) to update the comment for a given media item. The software that handles this request verifies the user's session is active and that the user has access to the given media item, then updates a database maintaining the meta data for the inspection media and updates the comment to that of what was provided.

Similarly, the AUTH can click a trash can icon (in one embodiment) to indicate the media item should be deleted. In this case the user's session is validated and care is taken in the request handler to verify the user has access to the provided unique media item ID and then deletes the media item. This can be a "hard" delete where the item is physically deleted from the database or storage subsystem or can be a "soft" delete where the media item is merely flagged as "deleted" but can be restored in the future if required.

In yet another embodiment, a feature may be enabled for the AUTH that takes all the captured snapshots (and/or media items such as video) and converts them into a single video file for easy viewing. This feature is enabled by using a program such as "ffmpeg" or "avcodec" in the Linux™ operating system that takes any number of single images (or video fragments) and converts them to a video format in the order specified with a given frame rate and/or delay between each image. If this request is made by the AUTH, then the resulting MP4 can be downloaded in real-time or sent to a queue background processing system to email the AUTH upon completion and provide them a link for viewing (in one embodiment).

The AUTH may also bring up a carousel viewer which enables the AUTH to scroll forwards and backwards across many images and videos for easy viewing. This is accomplished by many existing carousel viewing packages available for a fee or open source/public domain.

In another embodiment, the FA may rotate their phone/device between landscape and portrait orientation. In this case, the PFWS, upon receipt of an image, detects the orientation and may perform additional processing or formatting when storing or displaying to the AUTH in the media library.

Figure 8:
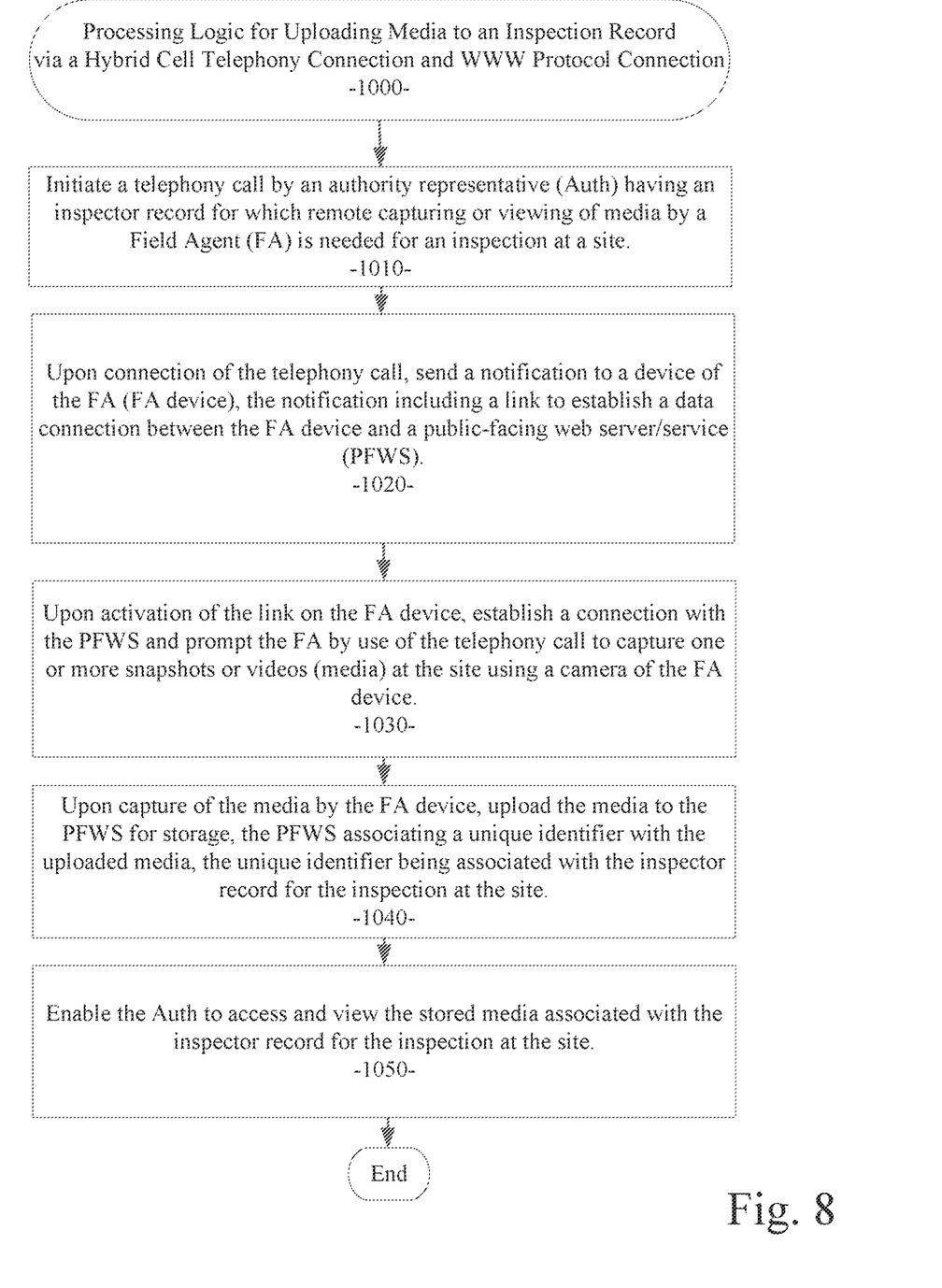
FIG. 8 is a processing flow diagram that illustrates an example embodiment of a method as described herein.

Referring now to FIG. 8, a processing flow diagram illustrates an example embodiment of a method as described herein. The method 1000 of an example embodiment can include: initiating a telephony call by an authority representative (Auth) having an inspector record for which remote capturing or viewing of media by a Field Agent (FA) is needed for an inspection at a site (processing block 1010); upon connection of the telephony call, sending a notification to a device of the FA (FA device), the notification including a link to establish a data connection between the FA device and a public-facing web server/service (PFWS) (processing block 1020); upon activation of the link on the FA device, establishing a connection with the PFWS and prompting the FA by use of the telephony call to capture one or more snapshots or videos (media) at the site using a camera of the FA device (processing block 1030); upon capture of the media by the FA device, uploading the media to the PFWS for storage, the PFWS associating a unique identifier with the uploaded media, the unique identifier being associated with the inspector record for the inspection at the site (processing block 1040); and enabling the Auth to access and view the stored media associated with the inspector record for the inspection at the site (processing block 1050).

In various example embodiments described herein, a computer-implemented system and method for uploading media to an inspection record via a hybrid cell telephony connection and WWW protocol connection are disclosed. In the various example embodiments described herein, a computer-implemented tool or software application (app) as part of a media upload system is described to automate and improve the ability for a user authority representative to authorize a media upload from a Field Agent operating a mobile device that supports SMS, MMS, and telephony. The authority representative can identify an inspection for which they will allow texted-in media artifacts by the Field Agent. In various example embodiments described herein, the media upload system provides a series of devices and processes to facilitate the capture and uploading of inspection artifacts to one or more of a plurality of network-connected recipients. As a result, the described embodiments improve the fields of data communication, network connectivity, network-based media content uploading and publication, and provide an improved ability for authority representatives, Field Agents, and Telephony Service Providers to efficiently connect, engage, and communicate with each other for an inspection or other activity.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
    initiating a telephony call by an authority representative (Auth) having an inspector record for which remote capturing or viewing of media by a Field Agent (FA) is needed for an inspection at a site;
    upon connection of the telephony call, sending a notification to a device of the FA (FA device), the notification including a link to establish a data connection between the FA device and a public-facing web server/service (PFWS);
    upon activation of the link on the FA device, establishing a connection with the PFWS and prompting the FA by use of the telephony call to capture one or more snapshots or videos (media) at the site using a camera of the FA device;
    upon capture of the media by the FA device, uploading the media to the PFWS for storage, the PFWS associating a unique identifier with the uploaded media, the unique identifier being associated with the inspector record for the inspection at the site; and
    enabling the Auth to access and view the stored media associated with the inspector record for the inspection at the site.

2. The method of claim 1 further including obtaining a global positioning system (GPS) location of the FA device and enabling the Auth to verify that the FA device is at an appropriate location.

3. The method of claim 1 further including connecting a Uniform Resource Locator (URL) to the unique identifier.

4. The method of claim 1 wherein the telephony call is a Voice-over-IP call (VOIP).

5. The method of claim 1 wherein the telephony call is a group call with a plurality of participants.

6. The method of claim 1 further including providing the Auth with an Auth User Facing Dashboard (AUFD) user interface, which keeps a list of media uploaded during the inspection at the site and provides a user interface to view and manipulate various components of the uploaded media.

7. The method of claim 6 wherein the AUFD enables the Auth to add comments to a particular media item.

8. The method of claim 6 wherein the AUFD enables the Auth to combine a plurality of media items into a single media item.

9. The method of claim 1 further including, upon activation of the link on the FA device, invoking an application on the FA device.

10. The method of claim 1 further including creating a watermark for each component of the uploaded media, the watermark including a date and time stamp.

11. A computer-implemented system comprising:
    a public-facing web server/service (PFWS);
    an authority representative (Auth) device, the Auth device configured to initiate a telephony call to a Field Agent (FA), the Auth having an inspector record for which remote capturing or viewing of media by the FA is needed for an inspection at a site; and
    an FA device for use by the FA, the FA device configured to receive the telephony call from the Auth device, the FA device also configured to receive a notification from the Auth device, the notification including a link to establish a data connection between the FA device and the PFWS, upon activation of the link on the FA device, the FA device configured to establish the connection with the PFWS and to prompt the FA by use of the telephony call to capture one or more snapshots or videos (media) at the site using a camera of the FA device, upon capture of the media by the FA device, the FA device configured to upload the media to the PFWS for storage, the PFWS configured to associate a unique identifier with the uploaded media, the unique identifier being associated with the inspector record for the inspection at the site, the Auth device further configured to enable access and viewing of the stored media associated with the inspector record for the inspection at the site.

12. The system of claim 11 being further configured to obtain a global positioning system (GPS) location of the FA device and enable the Auth to verify that the FA device is at an appropriate location.

13. The system of claim 11 being further configured to connect a Uniform Resource Locator (URL) to the unique identifier.

14. The system of claim 11 wherein the telephony call is a Voice-over-IP call (VOIP).

15. The system of claim 11 wherein the telephony call is a group call with a plurality of participants.

16. The system of claim 11 being further configured to provide the Auth with an Auth User Facing Dashboard (AUFD) user interface, which is configured to keep a list of media uploaded during the inspection at the site and provide a user interface to view and manipulate various components of the uploaded media.

17. The system of claim 16 wherein the AUFD being further configured to enable the Auth to add comments to a particular media item.

18. The system of claim 16 wherein the AUFD being further configured to enable the Auth to combine a plurality of media items into a single media item.

19. The system of claim 11 wherein the notification is of a type selected from a group consisting of: a text message, an SMS message, a direct message, an email, and a push message.

20. The system of claim 11 being further configured to create a watermark for each component of the uploaded media, the watermark including a date and time stamp.

* * * * *